United States Patent
Leber

(10) Patent No.: US 7,017,722 B2
(45) Date of Patent: Mar. 28, 2006

(54) HYDRODYNAMIC TORQUE CONVERTER

(75) Inventor: Fritz Leber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 85 days.

(21) Appl. No.: 10/800,590

(22) Filed: Mar. 15, 2004

(65) Prior Publication Data

US 2004/0188209 A1    Sep. 30, 2004

(30) Foreign Application Priority Data

Mar. 28, 2003    (DE)    ................................. 103 14 335

(51) Int. Cl.
F16H 45/00    (2006.01)
F16H 61/14    (2006.01)

(52) U.S. Cl. ...................... 192/3.27; 192/3.3; 192/3.33

(58) Field of Classification Search ............... 192/3.25, 192/3.27, 3.29, 3.3, 3.31, 3.33
See application file for complete search history.

(56) References Cited

U.S. PATENT DOCUMENTS

| | | | | |
|---|---|---|---|---|
| 3,280,657 A | * | 10/1966 | Holdeman ................. 192/3.25 |
| 3,820,417 A | * | 6/1974 | Allen et al. ................... 192/3.3 |
| 3,893,551 A | * | 7/1975 | Ahlen ........................ 192/3.33 |
| 4,468,988 A | * | 9/1984 | Hiramatsu .................... 477/65 |
| 4,880,090 A | * | 11/1989 | Ando .......................... 192/3.3 |
| H964 H | * | 9/1991 | Olson et al. ................. 324/174 |
| 5,318,159 A | * | 6/1994 | Kashiwabara .............. 192/3.31 |
| 5,361,880 A | * | 11/1994 | Bojas ......................... 192/3.29 |
| 5,372,226 A | * | 12/1994 | Waterbury et al. ........... 192/3.3 |
| 5,509,520 A | | 4/1996 | Evans et al. ................ 192/3.23 |
| 5,549,184 A | * | 8/1996 | Loffler et al. ................. 192/3.3 |
| 6,491,586 B1 | * | 12/2002 | Nakamura et al. ........... 192/3.3 |
| 2004/0188210 A1 | * | 9/2004 | Leber ........................ 192/3.29 |

FOREIGN PATENT DOCUMENTS

DE    195 21 458 A1    12/1995
EP    0 488 358 A1    6/1992

* cited by examiner

*Primary Examiner*—Rodney H. Bonck
(74) *Attorney, Agent, or Firm*—Davis & Bujold, P.L.L.C.

(57) ABSTRACT

To control one clutch (2) in a hydrodynamic torque converter, the pressure acting upon one first piston area (4) is supplied to a control unit which, depending on the pressure, adjusts the pressure acting upon a second piston area (5). It is possible to exactly adjust the piston force acting upon a clutch (2) even in the presence of changing pressure ratios within the hydrodynamic torque converter.

18 Claims, 3 Drawing Sheets

HYDRODYNAMIC TORQUE CONVERTER

This application claims priority from German Application Serial No. 103 14 335.1 filed Mar. 28, 2003.

FIELD OF THE INVENTION

The invention relates to a hydrodynamic torque converter.

BACKGROUND OF THE INVENTION

Generic hydrodynamic torque converters comprise a housing connectable via a clutch with a pump impeller and while rotating said pump impeller conveys pressure fluid to a turbine wheel connected with one output of the hydrodynamic torque converter which preferably forms the drive mechanism of a powershift transmission. The hydraulic pressure within the converter housing changes depending on the state of operation of the hydrodynamic converter. In generic converters the housing, in order to cool the converter, is flown through with pressure fluid conveyed by a hydraulic pump. The hydraulic pump is often connected with the prime mover whereby the flow rate varies depending on the input rotational speed of the hydraulic pump. The variation of the flow rate additionally influences the hydraulic pressure in the converter housing.

DE 195 21 458 A1 discloses a hydrodynamic torque converter where a prime mover can be connected via a clutch with the pump impeller.

The problem on which this invention is based is to provide a hydrodynamic torque converter with one clutch within the converter housing where the clutch can be controlled with precision.

SUMMARY OF THE INVENTION

The inventive hydrodynamic torque converter comprises one housing connected with a prime mover, the housing being connectable via at least one clutch with other parts of the converter. The actuation device of the clutch has at least one piston which comprises one first piston area directly loaded with the pressure fluid located in the interior of the housing. The converter inner pressure, which varies as result of the operating conditions of the converter and the rotational speed of the hydraulic pump, thus acts upon said first piston area. The second area of the piston of the actuation device forms one side of a space which can be loaded with pressure fluid by a supply line. If the clutch is purposefully brought to slip, then a defined piston force is needed which acts upon the clutch. Since the hydraulic pressure acting upon the first piston area steadily varies, the hydraulic pressure acting upon the second area likewise has to be steadily changed in order that the piston exerts a defined force upon the clutch. Therefore, according to the invention, the hydraulic pressure acting upon the second piston area changes according to the hydraulic pressure acting upon the first piston area. In a first embodiment, the pressure acting upon the first piston area, is directly or indirectly measured by a pressure sensor which relays this pressure signal to an electronic control unit which adjusts the pressure acting upon the second piston area according to a nominal value setting and according to the measured pressure acting upon the first piston area so that the piston exerts a defined force upon the clutch. The pressure sensor can be situated here in the direct proximity of the first piston area, but it is possible to deliver the pressure at one other place, via a connection, such as a line or hole in a shaft, the pressure fluid acting upon the first piston area having to communicate with the delivery place. It is possible to also make use of correction factors depending, for example, on rotational speed or pressure medium temperatures. Here a hole is preferably used in the non-rotatable shaft connected with the stator for transmitting the pressure.

In another embodiment, there exists a connection to the pressure medium acting upon the first piston area to a valve unit whose pressure medium supply is the pressure medium acting upon the first piston area and which according to a nominal value setting guides this pressure medium to the second piston area. The same pressure thus acts upon the first and the second piston areas when the valve unit is fully open whereby the clutch is In opening direction and transmits no torque. By reducing the pressure upon the second piston area, the pressure of the first piston area prevails and the clutch is actuated in closing direction. Depending on the variation of the pressure acting upon the first piston area and the nominal value setting, the pressure acting upon the second piston area is adjusted by the valve unit. In one other embodiment, a connection exists between the pressure medium acting upon the first piston area and a valve unit, said pressure medium and thus the pressure assuming a pure control function of the valve unit. The second piston area is supplied with pressure medium by a source which can be, for example, a hydraulic pump, in addition, which assumes the through flow of the hydrodynamic torque converter or a lubrication pump of a powershift transmission. The valve unit guides pressure medium from said hydraulic pump according to the pressure acting upon the first piston area and the nominal value setting in the space formed with the second piston area. In another embodiment, the valve units described can be combined with the electronic control unit and, in addition, it is possible to issue the output signal of the electronic control unit to a proportional valve which then adjusts the clutch pressure acting upon the second piston area. In another embodiment, it is possible In the electronic control unit to process together correction factors like, for example, the rotational speed of the prime mover, the rotational speed of the pump impeller, the rotational speed of the turbine impeller, one characteristic of the hydrodynamic converter, the rotational speed on one output or measured torque on parts of the hydrodynamic converter or on parts of the transmission.

By the inventive solution, it is thus possible to control a clutch exactly within a hydrodynamic torque converter and purposefully keep it in a defined slip state.

BRIEF DESCRIPTION OF THE DRAWINGS

The invention will now be described, by way of example, with reference to the accompanying drawings in which.

DETAILED DESCRIPTION OF THE INVENTION

Figure 1:
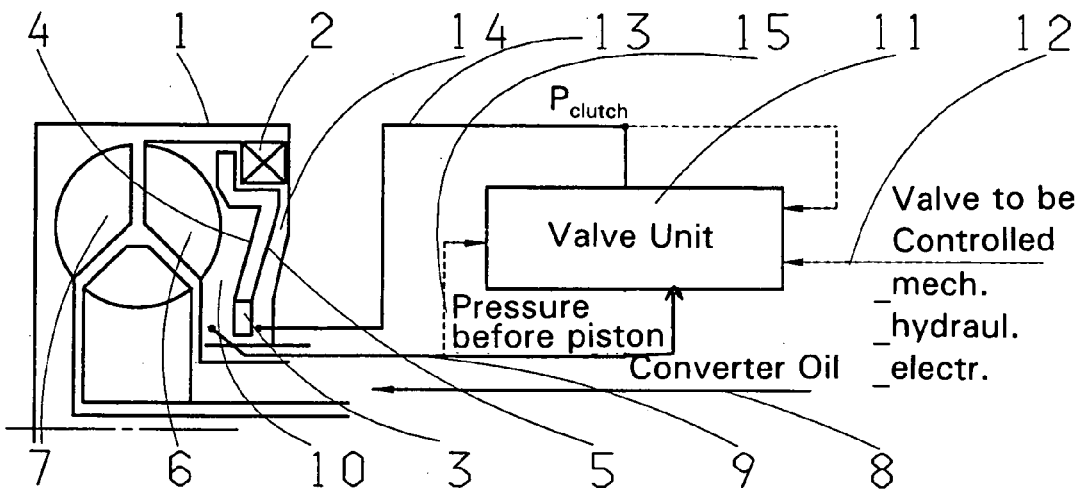
FIG. 1 is a diagram of a hydrodynamic torque converter with one valve unit having its pressure medium supply connected with the pressure medium acting upon the first piston area.

FIG. 1:

A prime mover (not shown) drives a converter housing 1 connected with a primary clutch 2. One piston 3 has a first piston area 4 and a second piston area 5. If the hydraulic pressure prevails upon the piston area 4, the clutch 2 is actuated in closing direction and connects the converter housing 1 with a pump impeller 6 of the hydrodynamic converter. By rotation of the pump impeller 6 pressure medium within the converter housing 1 is conveyed to a turbine impeller 7 which thereby produces a torque. In order to cool the parts within the converter housing 1, the pressure medium flows steadily via a pressure medium supply line 8 through the hydrodynamic converter. This pressure medium is preferably conveyed by a hydraulic pump that communicates with the prime mover. By changing the rotational speed of the prime mover, the pressure within the housing 1 changes and thus the pressure upon the first piston area 4. A space 10 is connected with a valve unit 11 via a line 9. If the valve unit 11 is now adjusted by a nominal value setting 12 which can be, for example, a pedal or also a setting of an electronic control unit, the pressure medium flows via the line 9 and the valve unit 11 to a line 13 and from there into a space 14. The piston 3 actuates the clutch 2 with the force from the differential pressure which acts upon the first piston area 4 and upon the second piston area 5 and actuates the clutch 2 in closing direction. If the pressure acting upon the first piston area 4 changes, the pressure in the line 9 and a line 15 changes whereby the valve unit 9, likewise, changes the pressure in the line 13 and the differential pressure acting upon the piston 3 remains the same. The clutch 2 is thus actuated with an unchanged closing force.

FIG. 2:

The mode of operation of the hydrodynamic torque converter corresponds to the mode of operation such as disclosed in FIG. 1 and can be understood from the description of FIG. 1.

Figure 2:
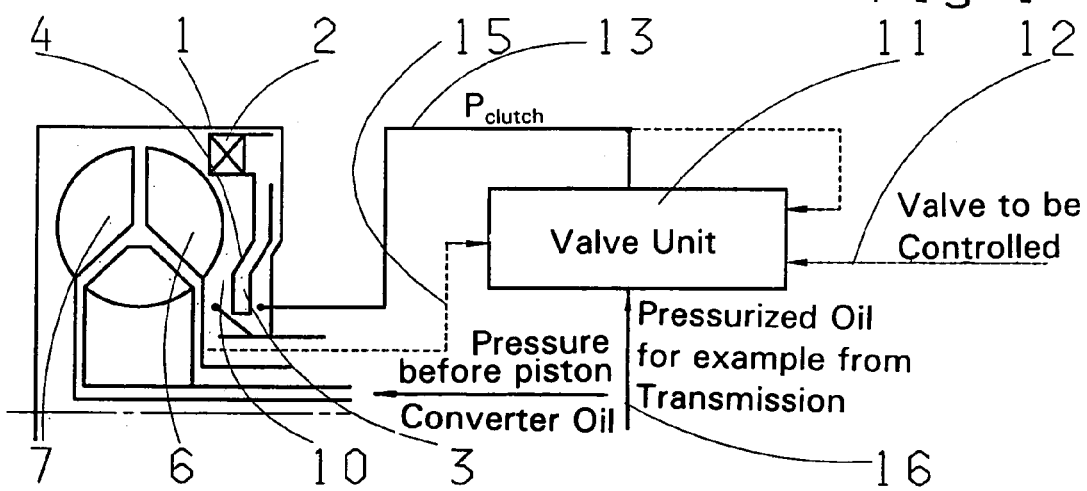
FIG. 2 is a hydrodynamic torque converter with a valve unit having its pressure medium supply connected with a hydraulic pump.

The hydrodynamic torque converter of FIG. 2 differs from the representation of FIG. 1 in the supply of the pressure medium to the valve unit 11. The valve unit 11 is supplied with pressure medium via a line 16 which is connected with a pressure medium source of a hydraulic pump such as from a rear-mounted powershift transmission. The space 14 is accordingly loaded with pressure medium from the hydraulic pump (not shown) of the transmission. The valve unit 11 is adjusted in a manner analogous to FIG. 1 via the pressure medium, which reaches the valve unit 11 via the line 15.

Figure 3:
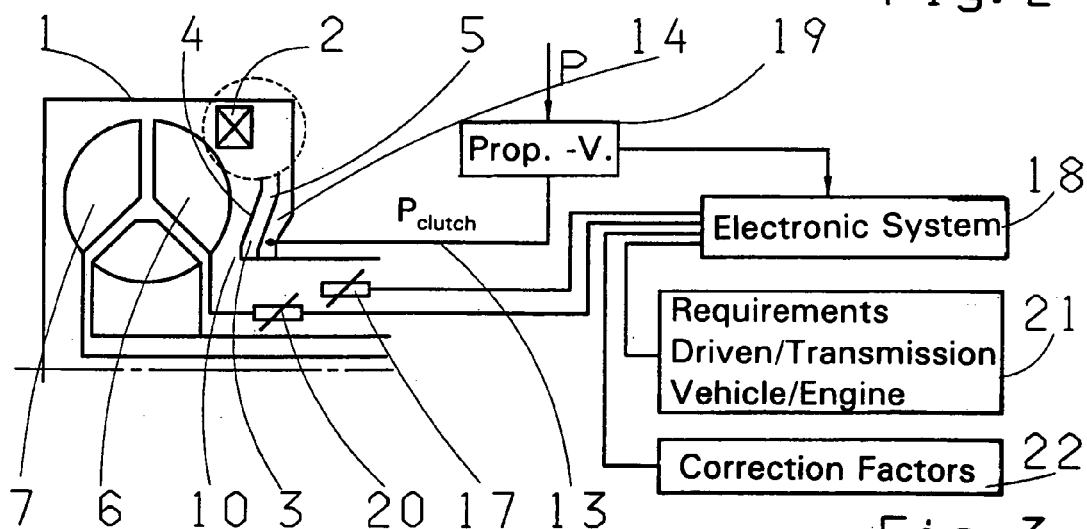
FIG. 3 is a hydrodynamic torque converter with an electronic control unit which processes signals from a pressure sensor.

FIG. 3:

The mode of operation of the hydrodynamic torque converter of FIG. 3 corresponds to the mode of operation of the hydrodynamic torque converter of FIGS. 1 and 2.

Unlike the design described in FIG. 1 and 2, the torque converter in FIG. 3 contains one pressure sensor 17 which determines the pressure acting upon the first piston area 4 and supplies it to an electronic control unit 18. The electronic control unit issues a signal to a proportional valve 19 and controls it according to a single rotational speed sensor 20 and nominal value settings 21 and correction factors 22. The proportional valve 19 supplies the space 14 with pressure medium and pressurizes the second piston area 5 in order to apply to the clutch 2 a defined force via the piston 3.

FIG. 4:

The converter housing 1 is connected with a prime mover (not shown) and driven. The primary clutch 2 connects the housing 1 with the pump impeller 6. The turbine impeller 7 can be connected, via a converter bridge clutch 23, with the housing 1. Upon the first piston area 4 acts the variable pressure within the housing which depends on the operational parameters and the operational state of the converter. The first piston area 4 and the space 10 are connected via the line 9 with a valve or control unit 11. The pressure of the space 10 can be detected via the line 9. While pressure medium is passed into the space 14, via the line 13, hydraulic pressure acts upon the second piston area 5. The resulting differential pressure from the pressure upon the first piston area 4 and the second piston area 5 actuates the piston 3. In order to supply the clutch 2 in the open state with lubricant, there is located in the piston 3 at least one aperture 24 through which lubricant can be passed through the discs of the clutch 2. It is possible to seal the space 14 by sealing elements 25. The outer discs of the clutch 2 are non-rotatably connected with the pump impeller 6, the inner discs of the clutch 2 being non-rotatably connected with the housing 1.

Figure 4:
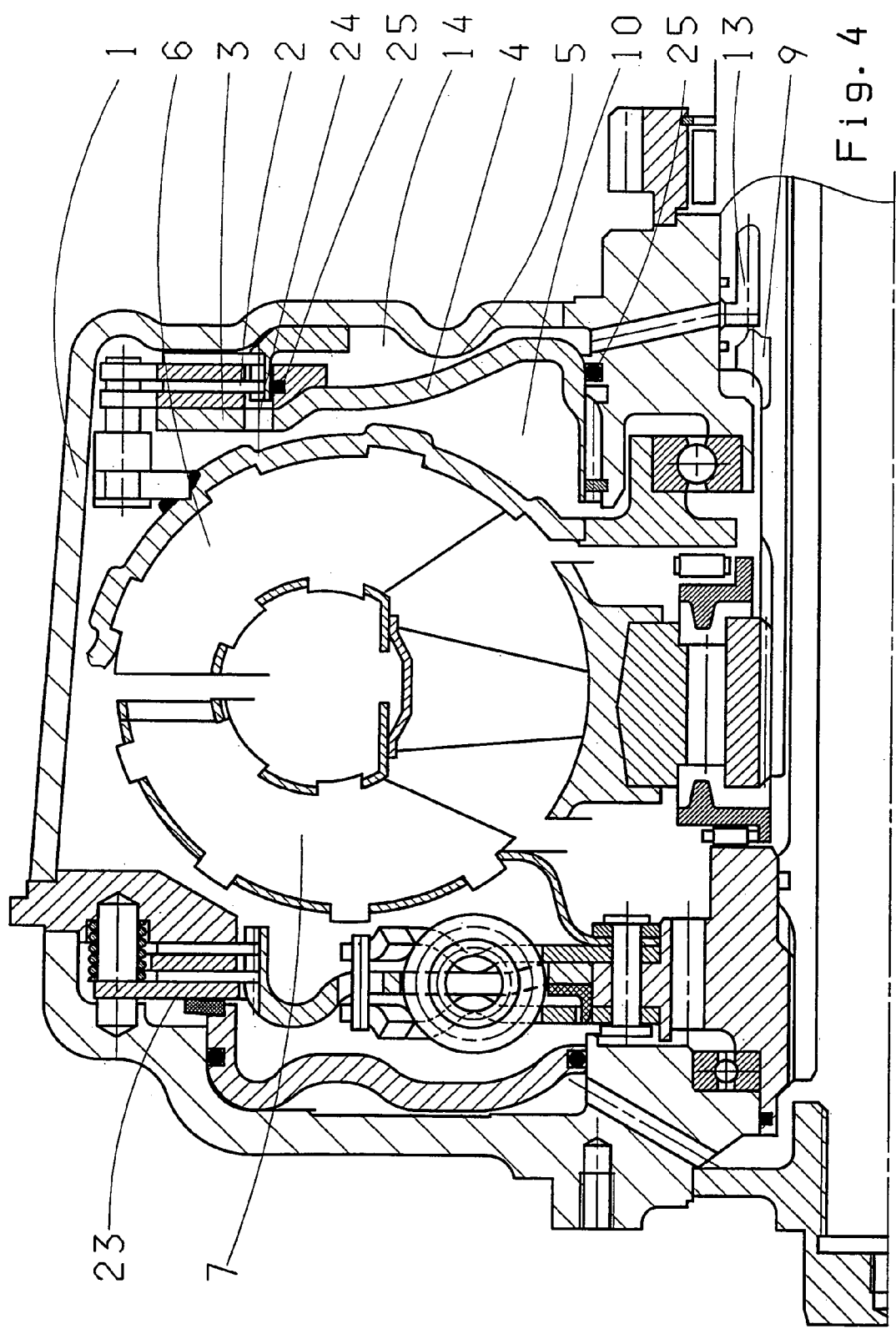
FIG. 4 is a sectional drawing of a hydrodynamic torque converter with a converter bridge clutch.
Figure 5:
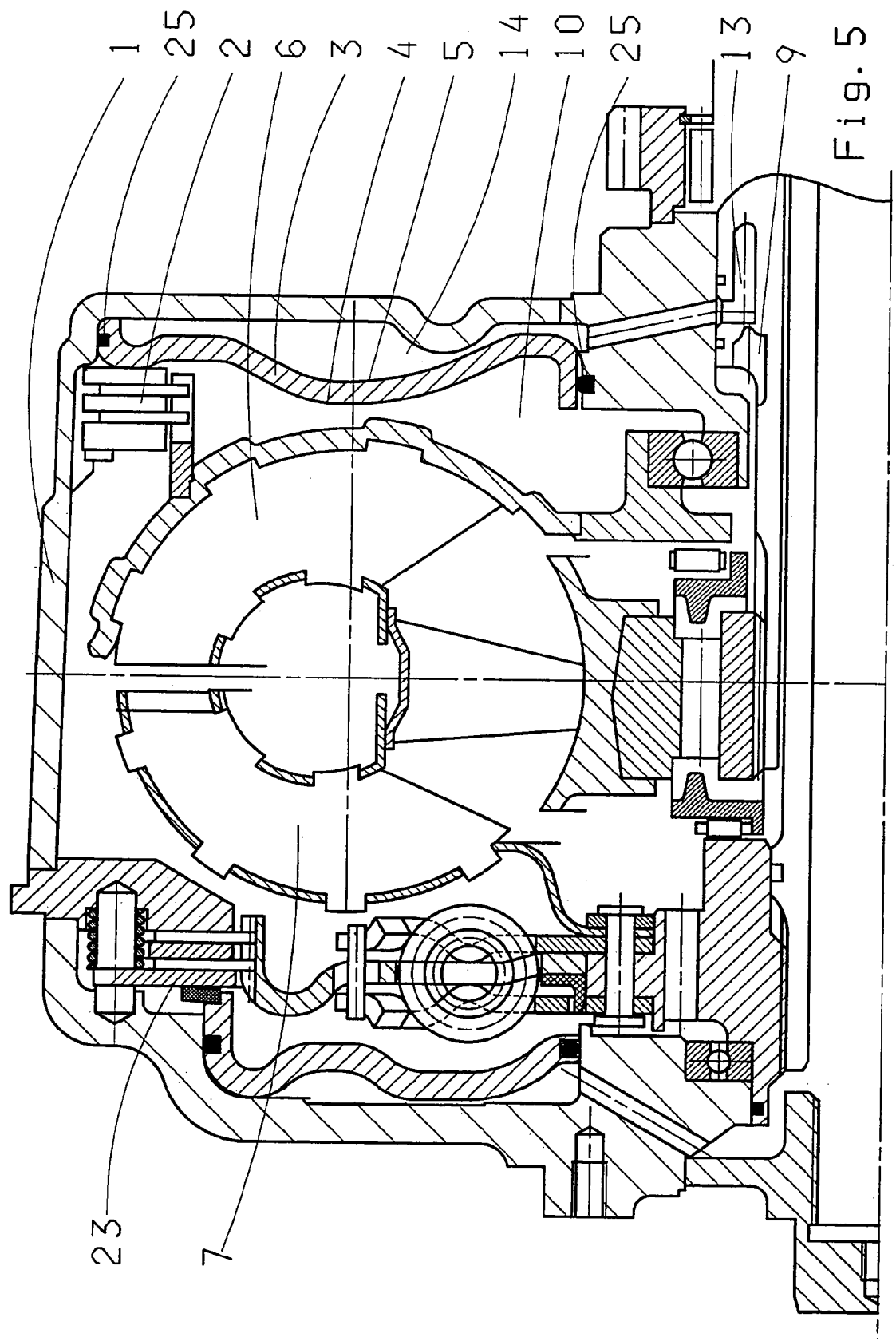
FIG. 5 is a sectional drawing of a hydrodynamic torque converter with a converter ridge clutch and a primary clutch.

FIG. 5:

The construction of the hydrodynamic torque converter corresponds to the hydrodynamic torque converter of FIG. 4, the inner rotating discs being non-rotatably connected with the pump impeller 6 and the outer rotating discs of the clutch 2 non-rotatably connected with the housing 1. It is hereby possible to enlarge the area of the piston 3.

REFERENCE NUMERALS 1 converter housing
2 primary clutch
3 piston
4 first piston area
5 second piston area
6 pump impeller
7 turbine impeller
8 pressure medium supply line
9 line
10 space
11 valve unit
12 nominal value setting
13 line
14 space
15 line
16 line
17 pressure sensor
18 electronic control unit
19 proportional valve
20 rotational speed sensor
21 nominal value setting
22 correction factor
23 converter bridge clutch
24 aperture
25 sealing elements

The invention claimed is:

1. A hydrodynamic torque converter located in a housing (1) comprising:
    at least one clutch (2);
    an actuation device having at least one piston (3);
    a hydraulic pressure within said housing (1) acting upon a first piston area (4);
    a hydraulic pressure changeable by a control unit (11) acting upon a second piston area (5);
    the hydraulic pressure acting upon said first piston area (4) acting directly or indirectly upon said control unit (11) and said control unit (11) adjusts the hydraulic pressure upon said second piston area (5) depending on the hydraulic pressure upon said first piston area (4); and wherein one drive mechanism of said torque converter (1) is connectable via said at least one clutch (2) with one pump impeller (6) of said torque converter.

2. The hydrodynamic torque converter according to claim 1, wherein said control unit (11) has one valve unit, a pressure medium supply of which is connected with a pressure medium acting upon said first piston area (4) and which depending on a nominal value setting (12) connects the pressure medium acting upon said first piston area (4) with a pressure medium acting upon said second piston area (5).

3. The hydrodynamic torque converter according to claim 2, wherein a space (10) formed by said converter housing (1) and said first piston area (4) is connected via one line (9) with said valve unit (11).

4. The hydrodynamic torque converter according to claim 3, wherein said line (9) is located in a non-rotatable shaft connected with a stator.

5. The hydrodynamic torque converter according to claim 1, wherein said control unit (11) has one valve unit connected with a pressure medium acting upon said first piston area (4), the valve unit receives a pressure medium supply (16) connected with a pressure medium source of a transmission pump and which depending on a nominal value setting (12) and the internal hydraulic pressure, acts upon said second piston area.

6. The hydrodynamic torque converter according to claim 1, wherein a pressure sensor (17) determines the hydraulic pressure acting upon said first piston area (4) and an electronic control unit (18) adjusts the hydraulic pressure acting upon said second piston area (5) depending on a nominal value setting.

7. The hydrodynamic torque converter according to claim 6, wherein one rotational speed sensor (20) determines a rotational speed of a pump impeller (6) and said electronic control unit (18), depending on a rotational speed of said pump impeller (6), adjusts the pressure acting upon said first piston area (4) and a nominal speed setting the pressure acting upon said second piston area.

8. The hydrodynamic torque converter according to claim 1, wherein a supply line (13) of the pressure medium acting upon said second piston area (5) is located in a non-rotatable shaft connected with a stator.

9. A hydrodynamic torque converter located in a housing (1) comprising:
a drive mechanism connectable via an input clutch (2) to a pump impeller within said torque converter housing;
an actuation device for closing the input clutch (2) and connecting the drive mechanism to the pump impeller, the actuation device comprising at least one piston (3) having a first piston area (4) and an oppositely disposed second piston area (5);
an internal hydraulic pressure within said housing (1) acting upon the first piston area (4) and a second hydraulic pressure changeable by a control unit (11) acting upon the second piston area (5);
wherein the internal hydraulic pressure acting upon said first piston area (4) is applied to said control unit (11) and said control unit (11) adjusts the second hydraulic pressure upon said second piston area (5) depending on the internal hydraulic pressure to regulate the input clutch connecting the drive mechanism to the pump impeller.

10. The hydrodynamic torque converter according to claim 9, wherein said control unit (11) comprises a valve unit receiving a pressure medium supply from the first piston area (4) at the internal hydraulic pressure and connecting the pressure medium supply tome second piston area (5) with the internal hydraulic pressure altered according to a nominal value setting (12) of the valve unit to obtain the second hydraulic pressure acting on the second piston area (5) and a differential hydraulic pressure which actuates the at least one piston (3).

11. The hydrodynamic torque converter according to claim 10, wherein a space (10) formed by said converter housing (1) and said first piston area (4) is connected via a hydraulic line (9) with said valve unit (11).

12. The hydrodynamic torque converter according to claim 11, wherein said hydraulic line (9) is located in a non-rotatable shaft connected with a stator.

13. The hydrodynamic torque converter according to claim 9, wherein said control unit (11) comprises a valve unit receiving the internal pressure medium from the first piston area (4) at the internal hydraulic pressure, the valve unit also receiving a second pressure medium supply (16) from a transmission pump and connecting the second pressure medium supply (16) to the second piston area (5), with the second pressure medium supply altered according to the internal hydraulic pressure and a nominal value setting (12) of the valve unit to obtain the second hydraulic pressure acting on the second piston area (5) and a differential hydraulic pressure which actuates the at least one piston (3).

14. The hydrodynamic torque converter according to claim 9, wherein a pressure sensor (17) determines the internal hydraulic pressure acting upon said first piston area (4) and an electronic control unit (18) adjusts the second hydraulic pressure acting upon said second piston area (5) depending on a nominal value setting.

15. The hydrodynamic torque converter according to claim 14, wherein a rotational speed sensor (20) determines a rotational speed of the pump impeller (6), and said electronic control unit (18) adjusts the second hydraulic pressure according to the rotational speed of said pump impeller (6) and the internal hydraulic pressure acting upon said first piston area (4).

16. The hydrodynamic torque converter according to claim 9, wherein a hydraulic supply line (13) for the second hydraulic pressure acting upon said second piston area (5) is located in a non-rotatable shaft connected with a stator.

17. A hydrodynamic torque converter located in a housing (1) comprising:
a drive mechanism connectable via an input clutch (2) to a pump impeller within said torque converter housing;
an actuation device for closing the input clutch (2) and connecting the drive mechanism to the pump impeller, the actuation device comprising at least one piston (3) having a first piston area (4) and an oppositely disposed second piston area (5);
an internal hydraulic pressure within said housing (1) acting upon the first piston area (4) and a second hydraulic pressure changeable by a control unit (11) acting upon the second piston area (5);
the internal hydraulic pressure acting upon said first piston area (4) is applied to said control unit (11) and said control unit (11) adjusts the second hydraulic pressure upon said second piston area (5) depending on the internal hydraulic pressure to regulate the input clutch connecting the drive mechanism to the pump impeller; and wherein a pressure sensor (17) determines the internal hydraulic pressure acting upon said first piston area (4) and an electronic control unit (18) adjusts the second hydraulic pressure acting upon said second piston area (5) depending on a nominal value setting.

18. The hydrodynamic torque converter according to claim 17, wherein a rotational speed sensor (20) determines a rotational speed of the pump impeller (6), and said electronic control unit (18) adjusts the second hydraulic pressure according to the rotational speed of said pump impeller (6) and the internal hydraulic pressure acting upon said first piston area (4).

\* \* \* \* \*